United States Patent [19]

Kenny et al.

[11] Patent Number: 5,546,037
[45] Date of Patent: Aug. 13, 1996

[54] NAPNOP CIRCUIT FOR CONSERVING POWER IN COMPUTER SYSTEMS

[75] Inventors: John D. Kenny; Min S. Ma, both of Sunnyvale, Calif.

[73] Assignee: Cirrus Logic, Inc., Fremont, Calif.

[21] Appl. No.: 151,876

[22] Filed: Nov. 15, 1993

[51] Int. Cl.⁶ .......................... H03K 3/033; H03K 3/017; H03K 3/02
[52] U.S. Cl. .......................... 327/230; 327/227; 327/176; 327/198
[58] Field of Search ..................... 327/172, 174, 327/175, 176, 198, 545, 546, 548, 276, 277, 284, 148, 227, 229, 230, 115, 117, 118; 365/227

[56] References Cited

U.S. PATENT DOCUMENTS

| | | | |
|---|---|---|---|
| 3,768,026 | 10/1973 | Pezzutti | 327/227 |
| 5,045,715 | 9/1991 | Fitch | 307/269 |
| 5,172,453 | 12/1992 | Chang et al. | 307/603 |
| 5,313,108 | 5/1994 | Lee et al. | 307/267 |
| 5,369,311 | 11/1994 | Wang et al. | 327/292 |
| 5,422,585 | 6/1995 | Fan Chiangi et al. | 327/170 |

FOREIGN PATENT DOCUMENTS 80105154  3/1992  Taiwan.

*Primary Examiner*—Toan Tran
*Attorney, Agent, or Firm*—Robert Platt Bell & Associates, P.C.; Steven Arthur Shaw; Oblon, Spivak, McClelland, Maier & Neustadt, P.C.

[57] ABSTRACT

A NAPNOP circuit for decreasing energy consumption of all or a portion of a microprocessor based system which includes a delay circuit for inhibiting or slowing the output of the system clock pulses for a variable length of time equal to a multiple of N clock pulses where N is a positive integer. The NAPNOP circuit has an input element for inputting a STARTNAP signal which begins a nap period during which the system clock pulses are inhibited or slowed, a clock input device for providing a plurality of selectable clock pulses as inputs to the delay circuit for controlling the operation of the computer system, and a gate element for terminating the nap period.

11 Claims, 2 Drawing Sheets

NAPNOP CIRCUIT FOR CONSERVING POWER IN COMPUTER SYSTEMS

BACKGROUND OF THE INVENTION

1. Field of the Invention

The present invention relates to the field of computing systems, and more particularly, microprocessor based systems, having improvements in energy conservation by decreasing the amount of electricity used or extending the battery life of a battery operated system. The invention also serves to reduce heat generation by reducing wasted energy which can allow greater system reliability and reduced requirements for air flow, fans, or other cooling methods.

2. Discussion of the Related Art

In this invention, the NAP refers to a short wait period during which power savings are achieved by reducing the number of system circuit elements that are clocked or that are clocked at full speed, since clock frequency is proportional to power consumption.

The NOP function commonly used in computer systems today derives its name from a no-operation function. This instruction allows the execution of a no-operation state in order to create a short time delay. Most microprocessor based systems today provide some type of NOP function which only serves to create a place holder in the processor instruction queue or to implement a fixed length short delay. In a typical microprocessor based system, the clock to the system remains fully active and the system power remains at peak levels during a NOP function.

In prior art systems, computers or microprocessor based systems have typically had to execute large numbers of NOPs or other types of dummy instructions to provide for delays of longer than one instruction cycle. One common problem with this type of methodology was that it suffered from large speed variations when the same programs were run on processors having different execution speeds.

In addition to a NOP function, another method commonly used to effect a wait period is to program a system timer or clock function to trigger an interrupt with an appropriate delay. However, this is substantially more complicated, requires additional system resources, and still requires that peak power be used needlessly.

Typically, power wasted in a system while in general use or during the execution of an operation intended specifically to do nothing has not been an issue as little or no consideration has previously been given to the power consumption of the system. With the desire for extended battery life in battery operated microprocessor based systems and energy conservation in AC electrically powered microprocessor based systems sponsored in part by environmental and economic concerns and the need to reduce heat generation in microprocessor based systems, the circuit according to the present invention overcomes the foregoing drawbacks of the conventional systems.

SUMMARY OF THE INVENTION

Accordingly, one object of the present invention is to provide a novel circuit that creates and implements a NAPNOP function, which is used to slow or delay the output of the clock signal to the system, or a portion of the system, in order to thereby reduce overall power consumption and heat generation of the system. The NAPNOP would also create a wait period, much the same as a NOP has done historically, but with more flexibility and accuracy on duration. The NAPNOP can be triggered either by a software command or by hardware upon the detection of system condition, such as specific interrupts, software instructions, or code sequences. Each trigger produces a NAP period, that is, a wait period during which power savings are achieved by slowing or delaying the clock to all or a portion of the system.

This NAPNOP function can be used or triggered either in software or hardware form whenever it is determined that the system or some portion of the system is not involved in useful activity, in order to create power savings without sacrificing system performance.

A NAPNOP could also be used to slow the clock signal when the system is involved in useful activity thus saving power and reducing heat generation while degrading performance. Such use of the NAPNOP would be warranted when energy conservation was deemed more important than performance, for instance to prolong battery life when battery recharging would not be possible for an extended period. Or, such use of a NAPNOP might be warranted if the tradeoff between performance loss and energy or heat savings seemed reasonable. For instance, a 10% loss in performance might be tolerated to gain a ten fold increase in battery life.

The NAPNOP allows the reduction in system power consumption to extend battery life in battery operated microprocessor based systems or to reduce power consumption in AC powered microprocessor based systems, which can result in a savings in energy bills and reduce harmful effects of energy generation and dissipation on the environment.

Another effect of the NAPNOP function is to reduce heat generated by the microprocessor based system. As microprocessors and their encompassing systems contain increasing numbers of circuits and operate at high frequencies, heat generation becomes more problematic. By reducing wasted energy, heat generation is reduced. Since the effects of heat can be harmful to system electronics, a reduction in heat generation can allow greater reliability. In addition, a reduction in heat can allow the removal of cooling devices such as fans and heat sinks, or a reduction or elimination of requirements for cooling air or liquid flow or the elimination of thermal measuring devices used to provide feedback on extreme heat conditions.

In order to achieve the above and other objects, the present invention includes a NAPNOP circuit for inhibiting or slowing the output of system clock pulses. This circuit includes a delay circuit for preventing the output of the system clock pulses for a variable length of time equal to a multiple of N clock pulses where N is a positive integer. The NAPNOP circuit has an input element for inputting a STARTNAP signal which begins a nap period during which the system clock pulses are prevented from being output from the delay circuit. The NAPNOP circuit also includes a clock input device for providing a plurality of clock pulses as inputs to the delay circuit for controlling the operation of the computer system, and a gate element for terminating the nap period and permitting the clock pulses to be output to the computer system.

In a preferred embodiment, the NAPNOP circuit includes a plurality of series connected flip flops, each of which delays the output of the clock signal by one clock pulse. Therefore, the period of time for delaying the output of the clock signal to the computer system can be set to any desired value based on the number of series connected flip flops employed. A STARTNAP signal is used to trigger the onset of the delay period during which the output of the final flip flop of the series connection is inhibited. An additional gate element is provided for immediately ending the nap period if, for example, during a nap an interrupt or other activity input command is generated. As an example, a keyboard input could generate such an interrupt.

The NAPNOP function according to the invention provides savings in power during nap periods. It also permits a more exact timing of delay periods and allows for more flexibility in the triggering or ending of delay periods. The NAPNOP is also effective in reducing power consumption and extending battery life in battery operated computer systems. It is further effective in reducing power consumption in AC powered computer systems so as to reduce the energy consumed by desktop systems. In both battery and AC powered systems, the heat generation of the system would also be reduced as a consequence of the reduction in power consumed. This provides for greater system reliability, and a reduction in the amount of cooling needed. This allows for more compact computer enclosures as the amount of air flow for cooling purposes is not as critical. Also, the NAPNOP circuit according to the invention may but need not diminish the system performance in order to achieve its power savings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
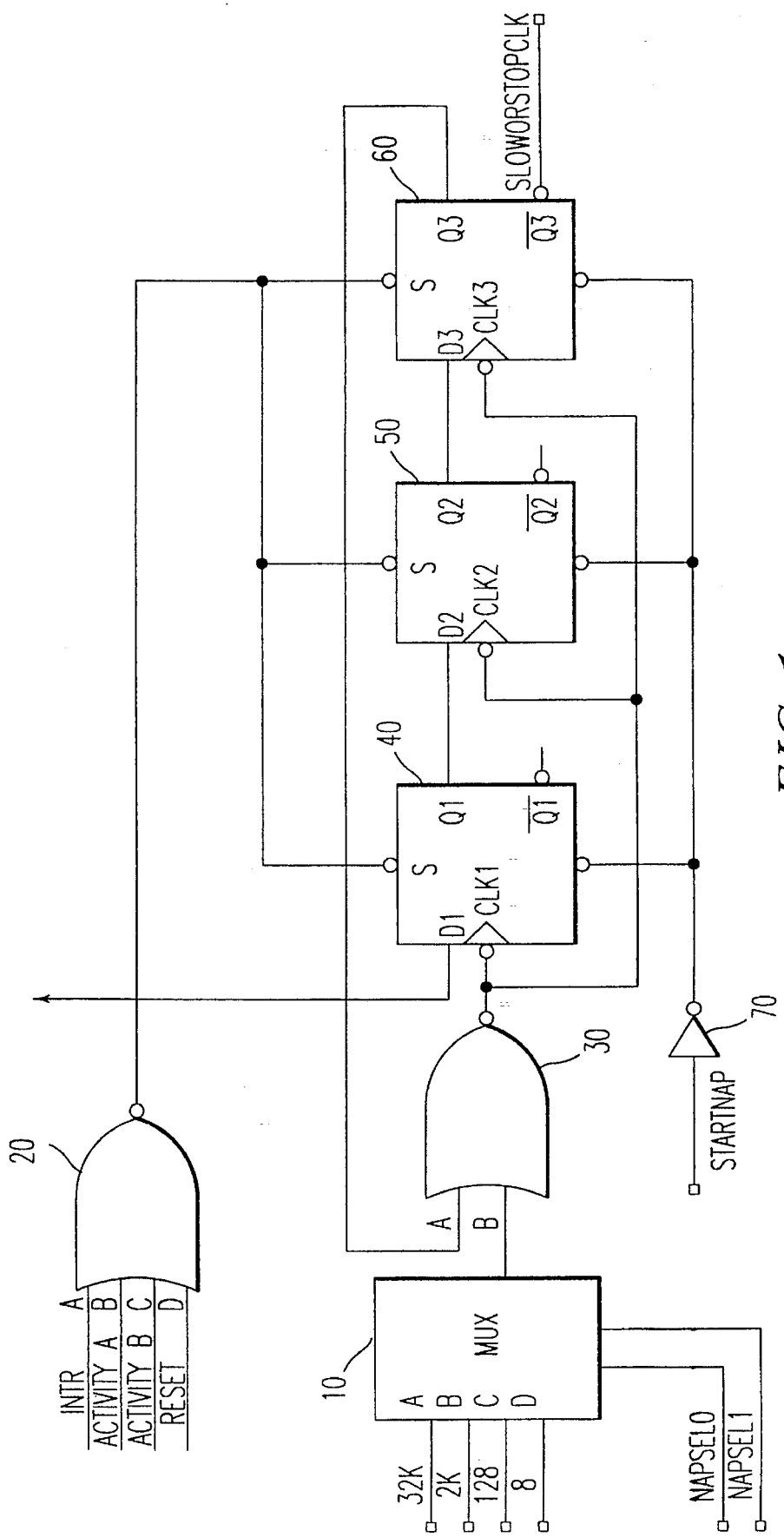
FIG. 1 represents a specific embodiment of the NAPNOP circuit according to the present invention.

Referring now to the drawings, and more particularly to FIG. 1 thereof, there is shown one embodiment of the NAPNOP circuit according to the present invention. The NAPNOP circuit shown in FIG. 1 provides a method of implementing a short time delay function while at the same time saving power. The NAPNOP circuit according to the invention operates by providing several real time delay options which can be triggered by software instructions, for example. These delay options could typically be anywhere from nanoseconds to hundreds of milliseconds. Further, this circuit could be implemented either internally within the processor itself or externally within some type of system controller. The nap period could be triggered by a system activity that indicated no useful activity was being performed or indicated that a loss in performance was reasonably warranted. Additionally, the nap period could be triggered by a software NAPNOP command. The NAPNOP could be implemented to create a fixed time delay or could be implemented to allow a user time delay or could be implemented to allow a user selectable time delay. In the latter case as in this embodiment, a command to select the time delay would precede the NAPNOP command. Or, the circuit could be implemented to allow system conditions to select the appropriate wait period in a programmable configuration. During this wait period, the system clock could be stopped within the microprocessor at the phase lock loop output of the clock or the microprocessor's clock could be stopped externally.

During a triggered delay, the system clock would be stopped within the microprocessor at a phase lock loop (PLL) output of the clock. Similarly, other system clocks, other devices, or other partitions of the system circuitry could be powered down during this delay in order to save additional power. A feature of the NAPNOP circuit is its ability to exit or terminate the delay period immediately upon any type of system interrupt or activity. Examples of system interrupts or activities that could terminate the NAPNOP include standard system interrupts as well as any special purpose interrupts such as system management interrupt (SMI) or a non-maskable interrupt (NMI). This ensures that there is no delay in responding to any significant system activity. For different situations it is useful to provide several options. The NAPNOP circuit of the invention could, for instance, exit on interrupt, not exit until done, or exit during interrupt or resume after interrupt if not already beyond its allotted time.

An example of an application of the NAPNOP circuit according to the present invention would be for use in a user interface program. For example, a program may write information to a video screen and then be required to wait some period of time while the user reads the screen or waits for an input from the keyboard or other interface device, before proceeding to write further information. Similarly, there are many other situations that require programs to wait for various periods of time.

Another example is during a hard disk read. The program must first request data from the disk and then wait for the disk controller to locate the appropriate data and respond, which might take several milliseconds. During this time period, it is desirable to prevent the output of the system clock to the various elements of the computer system in order to conserve system power. The NAPNOP function can be used very conveniently for this type of delay function. Because it is capable of programmable delays that can be much longer than a standard NOP and since multiple NAPNOPs can be strung together, any desired delay time period can be created. A NAPNOP circuit is more convenient and flexible in providing timing delays than conventional NOP loops. A conventional NOP loop would have multiple dummy instructions where the only purpose is to kill time.

The NAPNOP circuit shown in FIG. 1 includes a multiplexer 10 having a plurality of inputs provided with clocks of different frequencies. For example, a two bit NAPSEL signal is used to select anyone of four clock frequencies, which are used to establish the delay period of the NAPNOP. NAPSEL0 and NAPSEL1 would typically be driven from outputs of programmable register bits. NAPSEL0 and NAPSEL1 are gated into a multiplexer which could select, for example, 8, 128, 2000 or 32,000 Hertz clock signals. The selected clock then serves as a B input to OR gate 30. If the A input is low or "0" then the B signal, or equivalently, the clocking signal, is passed as the input to the series of three flip flops 40, 50 and 60. It should be noted that the inverter on the output of the OR gate 30 and the inverter on each of the clock inputs to the three flip flops will cancel each other. On the other hand, if the A signal is high or "1" then a constant "1" is passed as the input to each of the three flip flops and the clocking is essentially stopped. The data input to the flip flop 40 is always pulled high or "1". The output of flip flop 40 and flip flop 50 are used as the inputs to flip flop 50 and flip flop 60, respectively. The output of flip flop 60 then serves as the A input to OR gate 30. In this implementation, any one of four input signals may serve to set all three flip flops. The four signals in this case are INTR (an interrupt), ACTIVITYA, ACTIVITYB, or a RESET signal. ACTIVITYA and ACTIVITYB could be any activity in the system derived from a set of complex functions or from an input condition. All four conditions are gated through OR gate 20 and any one of the signals being active or high would cause this set condition to be met. It should be noted that the inverter on the output of the OR gate 20 and the inverter on the "S" terminal or set input to the flip flops serve to cancel each other out.

A STARTNAP signal is used to reset the three flip flops 40, 50 and 60. The STARTNAP signal could begin a nap period in response to a software NAPNOP command, a string of software commands suitable for replacement with a NAPNOP, or in response to a system activity including detection of lack of useful system activity. Any number of system activities could be used to trigger a nap period depending on the system application, implementation, or conditions. The STARTNAP signal, therefore, begins the nap period because the output of the flip flop 60, or Q3, is equal to the input of OR gate 30, i.e., signal A. With signal A pulled low by the reset action of STARTNAP, the clocking of input B is the clock input to flip flop 40. The STARTNAP signal is inverted by inverter element 70 which serves to cancel the inverter on the reset terminal of the flip flops.

The SLOWORSTOPCLK signal is the inverse of Q3 (or signal A) and goes high with the high state of the STARTNAP signal. The SLOWORSTOPCLK signal may then be used to stop the system clock within the microprocessor at the phase locked loop output of the clock or the microprocessor's clock could be stopped externally with a gate. The input to flip flop 40 is always pulled high and therefore, presuming that a clock signal has been selected by the multiplexer 10, the output of flip flop 40, Q1, goes high at the first rising edge of the clock input B. The input to flip flop 50, D2, equals Q1. With the input to flip flop 50, D2, now high, the output, Q2, goes high on the next rising edge of the clock signal input B. This output, Q2, is equal to the input of flip flop 60, D3. With the input of flip flop 60, D3, now high, the output Q3 is pulled high at the next rising edge of the clock. The SLOWORSTOPCLK signal is the inverse of Q3; it is pulled low thus ending the nap. Without an interrupt or activity triggering the set condition from OR gate 20, the nap is a multiple of three clock periods. It should be noted, however, that the nap period could be set to be any desirable number of clock pulses simply by adding or deleting one or more of the series-connected flip flops. If any of the four set conditions input to OR gate 20, i.e., the INTR, ACTIVITYA, ACTIVITYB, or RESET are active, the flip flop outputs, Q1, Q2 and Q3 would all be pulled high. This sets the signal A to a "1" or a high state and stops the clocking action by blocking signal B. With Q3 high, the SLOWORSTOPCLK signal is low, thus not allowing a nap. Thus, the nap can be prevented or ended immediately by virtue of some interrupt or activity signal.

By using the multiplexer 10 to select one of the plurality of different clock pulse frequencies, the present invention allows for further variations in the length of the nap periods by selecting a different input frequency clock pulse. As such, the present invention provides two ways of delaying the output of a clock signal, i.e., by adding more cascade-connected flip flips or by choosing a clock pulse signal having a lower frequency. Also, the length of the nap can be changed at any time by the action of one or more different activities or other interrupt signals which would immediately end the nap.

Figure 2:
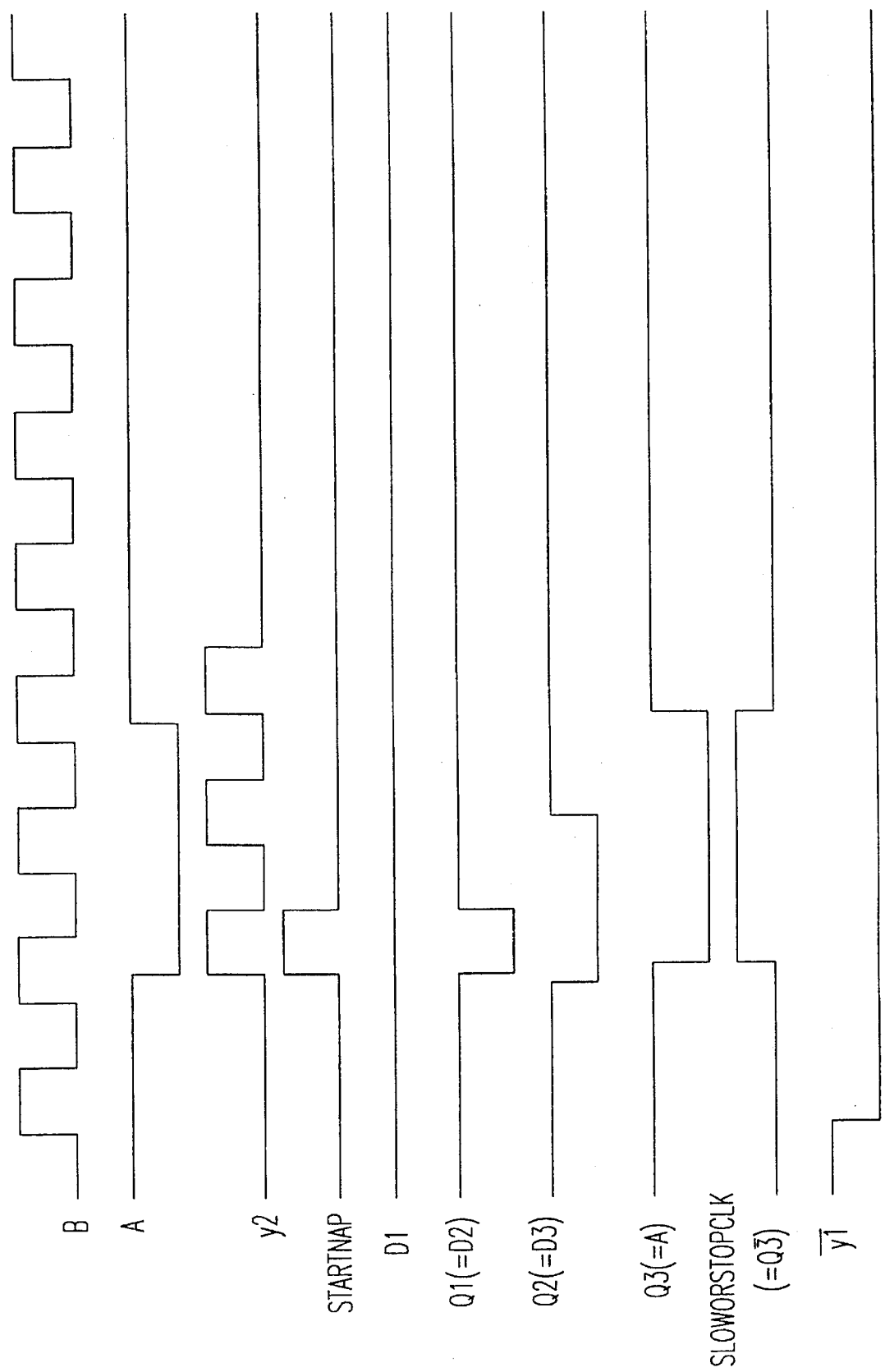
FIG. 2 illustrates a timing sequence for the triggering of the high/low states of the various elements of the NAPNOP circuit shown in FIG. 1.

The timing sequence shown in FIG. 2 will now be described with respect to the inputs and outputs of the various elements of FIG. 1. As shown, a clock signal B is selected from the multiplexer 10 by the input signals NAPSEL0 and NAPSEL1. This clocking signal B will be output to the inputs of each of the flip flops 40, 50, 60, the output Q3 of flip flop 60 will be "1" and therefore, the input signal A will also be "1". As can be seen from FIG. 2, when the STARTNAP signal goes high, the output of flip flop 40, Q1, will go low because the STARTNAP signal will reset flip flop 60 so that the output Q3 is zero and the SLOWORSTOPCLK signal goes high, thus starting the nap. As can also be seen from FIG. 2, the outputs Q2 and Q3 of flip flops 50 and 60, respectively, will also go low at the beginning of the nap, i.e., the point at which STARTNAP goes high. However, upon the beginning of the next clock cycle, the output Q1 will again go high, but the outputs Q2 and Q3 of the next two flip flops will have to wait one and two additional clock pulses, respectively, before they go back high. At the point when the third flip flop 60 finally goes high again, the SLOWORSTOPCLK signal will then return to the low state and the clock will again be output to the computer system. Therefore, the delay period, i.e., the nap period, will be equal to a value of three successive clock pulses, corresponding to the three successive flip flops 40, 50 and 60. However, a number of additional flip flops could be similarly connected in order to further extend this delay period, or fewer flip flops could be used in order to reduce the delay period. Also, by selecting one of a plurality of different clock frequencies, the delay period could be further varied.

It should also be noted that if an activity of appropriate type occurred such as to drive signal Y1 low, at any point during the nap period, this would immediately terminate the nap by forcing signal "SLOWORSTOPCLK" back low while simultaneously forcing all flipflops back to their idle state which is with their Q outputs high.

Obviously, numerous modifications and variations of the present invention are possible in light of the above teachings. It is therefore to be understood that, within the scope of the appended claims, the invention may be practiced otherwise then as specifically described herein.

What is claimed as new and desired to be secured by Letters Patent of the United States is:

1. In a computer system, a circuit for generating a signal for controlling a processor clock circuit, said circuit comprising:

first means for receiving a software controlled signal;

second means for receiving a plurality of different frequency clock signals and for receiving control signals for selecting one of the plurality of different frequency clock signals and outputting a selected one of the plurality of different frequency clock signals;

signal generating means coupled to said first means and said second means for receiving the selected one of the plurality of different frequency clock signals and generating a processor clock stopping signal to said processor clock circuit in response to the software controlled signal, the processor clock stopping signal having a duration proportional the selected one of the plurality of different frequency clock signals; and third means, coupled to said signal generating means, for inhibiting the processor clock stopping signal being output from said signal generating means in response to a second software controlled signal whereby the processor clock circuit is to be re-started.

2. In a computer system, a control circuit for controlling activation of a clock stopping circuit, said control circuit comprising:

a first receiving means for receiving and selecting one of a plurality of different frequency clock signals;

a second receiving means for receiving a first signal upon the occurrence of a predetermined trigger condition;

third receiving means for receiving a second signal upon the end of the predetermined trigger condition; and signal generating means for generating a pulse proportional to a selected one of the plurality of different frequency clock signals, said signal generating means coupled to said first receiving means, said second receiving means, and said third receiving means, for activating said clock stopping circuit for the duration of an activation period not exceeding the period of said pulse, the activation period beginning when said first signal is received by said second receiving means and ending either when said period expires or when said second signal is received by said third receiving means.

3. The control circuit according to claim 2, wherein said first receiving means comprises a multiplexer for selecting one of said plurality of different frequency clock signals.

4. The control circuit according to claim 3, wherein said multiplexer receives said plurality of different frequency clock signals and receives at least one control signal for selecting one of said plurality of different frequency clock signals will be output to said signal generating means.

5. The control circuit according to claim 2 wherein said signal generating means comprises a plurality of flip flop elements having input and output elements coupled to each other in series, one of said plurality of flip-flops having a clock input coupled to said first receiving means through a logic means for receiving as a clock signal the selected one of a first plurality of different frequency clock signals.

6. The control circuit according to claim 5, wherein said plurality of flip flop elements comprises N elements, where N is a positive integer and the output of the Nth flip flop element is applied to said logic means for applying the selected one of said plurality of different frequency clock signals selected from said multiplexer to said signal generating means.

7. In a computer system, a control circuit for controlling activation of a clock stopping circuit, said control circuit comprising:

a first receiving means for receiving and selecting one of a plurality of different frequency clock signals;

a second receiving means for receiving a first signal upon the occurrence of a predetermined trigger condition;

third receiving means for receiving a second signal upon the end of the predetermined trigger condition; and signal generating means for generating a pulse proportional to a selected one of the plurality of different frequency clock signals, said signal generating means coupled to said first receiving means, said second receiving means, and said third receiving means, for activating said clock stopping circuit for the duration of an activation period not exceeding the period of said pulse, the activation period beginning when said first signal is received by said second receiving means and ending either when the period of said pulse expires or when said second signal is received by said third receiving means;

wherein said signal generating means comprises a plurality of flip flop elements coupled to each other and coupled to said first receiving means through a logic means;

wherein said plurality of flip flop elements comprises N elements, where N is a positive integer and said plurality of flip flop elements are connected in series;

said logic means coupled to said signal generating means and said first receiving means, for receiving at a first input one of said different frequency clock signals selected from said first receiving means, and at a second input the output of said Nth flip flop element for applying said selected one of said different frequency clock signals to a first one of said N flip flops.

8. The control circuit according to claim 7, wherein said logic means is an OR gate.

9. A method for activating a clock stopping circuit in a computer system, comprising the steps of:

selecting one of a plurality of different frequency clock signals, inputting said one of a plurality of different frequency clock signals to a signal generating means, activating, from the output of said signal generating means, said clock stopping circuit for a length of time equal to N cycles of said one of a plurality of different frequency clock signals, where N is a predetermined positive integer, upon receiving at said signal generating means a signal for a predetermined triggering condition, and terminating said step of activating said clock stopping circuit in a computer system upon receiving at said signal generating means a signal indicative of the end of said predetermined triggering condition or upon the expiration of said length of time.

10. The method according to claim 9, wherein said step of inputting said one of a plurality of different frequency clock signals to a signal generating means comprises:

inputting said one of a plurality of different frequency clock signals to N series connected flip flop elements through a logic means.

11. The method according to claim 10, wherein said step of selecting one of a plurality of different frequency clock signals comprises:

multiplexing a plurality of different frequency clock signals in a multiplexer with a control signal.

* * * * *